US009767956B2

(12) United States Patent
Otsuka et al.

(10) Patent No.: US 9,767,956 B2
(45) Date of Patent: Sep. 19, 2017

(54) COMPOSITE PARTICLE OF SOFT-MAGNETIC METALLIC MATERIAL, METHOD FOR PRODUCING COMPOSITE PARTICLE, POWDER CORE, MAGNETIC ELEMENT, AND PORTABLE ELECTRONIC DEVICE

(71) Applicant: Seiko Epson Corporation, Tokyo (JP)

(72) Inventors: Isamu Otsuka, Hachinohe (JP); Yu Maeta, Hachinohe (JP); Toshikuni Sato, Hachinohe (JP)

(73) Assignee: Seiko Epson Corporation (JP)

( * ) Notice: Subject to any disclaimer, the term of this patent is extended or adjusted under 35 U.S.C. 154(b) by 684 days.

(21) Appl. No.: 14/084,011

(22) Filed: Nov. 19, 2013

(65) Prior Publication Data

US 2014/0138570 A1 May 22, 2014

(30) Foreign Application Priority Data

Nov. 20, 2012 (JP) ................................ 2012-254453

(51) Int. Cl.
*B32B 5/16* (2006.01)
*B05D 7/00* (2006.01)
(Continued)

(52) U.S. Cl.
CPC ....... *H01F 41/005* (2013.01); *H01F 1/14733* (2013.01); *H01F 1/14766* (2013.01);
(Continued)

(58) Field of Classification Search
CPC . C22C 2202/02; C22C 2202/04; C23C 10/28; C23C 24/02; C23C 28/30;
(Continued)

(56) References Cited

U.S. PATENT DOCUMENTS 5,227,235 A * 7/1993 Moro ...................... B22F 3/105 419/35
8,236,420 B2 * 8/2012 Skarman .................. B22F 1/02 427/212
(Continued)

FOREIGN PATENT DOCUMENTS

CN 1938114 A 3/2007
CN 101226802 B 5/2011
(Continued)

OTHER PUBLICATIONS

Petzold, Advantages of softmagnetic nanocrystalline materials for modern electronic applications, J. of Magnetism and Magnetic Mater. 242-245 (2002) 84-89.*
(Continued)

*Primary Examiner* — Holly Le
(74) *Attorney, Agent, or Firm* — Harness, Dickey & Pierce, P.L.C.

(57) ABSTRACT

A composite particle includes: a particle composed of a soft magnetic metallic material, and a coating layer composed of a soft magnetic metallic material having a different composition from that of the particle and fusion-bonded to the particle so as to cover the particle, wherein when the Vickers hardness of the particle is represented by HV1 and the Vickers hardness of the coating layer is represented by HV2, HV1 and HV2 satisfy the following relationship: $100 \leq HV1 - HV2$, and when half of the projected area circle equivalent diameter of the particle is represented by r and the average thickness of the coating layer is represented by t, r and t satisfy the following relationship: $0.05 \leq t/r \leq 1$.

12 Claims, 6 Drawing Sheets

(51) Int. Cl.

| | |
|---|---|
| ***C23C 10/30*** | (2006.01) |
| ***H01F 41/00*** | (2006.01) |
| ***H01F 1/147*** | (2006.01) |
| ***H01F 1/24*** | (2006.01) |
| ***H01F 27/255*** | (2006.01) |
| *C23C 10/28* | (2006.01) |
| *H01F 1/33* | (2006.01) |

(52) U.S. Cl.
CPC ............. *H01F 1/24* (2013.01); *H01F 27/255* (2013.01); *C23C 10/28* (2013.01); *C23C 10/30* (2013.01); *H01F 1/33* (2013.01)

(58) Field of Classification Search
CPC ....... C23C 28/32; C23C 28/321; C23C 30/00; C23C 30/005; C23C 10/30; C09C 3/063; C09C 1/0081; C09C 1/22; H01F 10/12; H01F 10/14; H01F 10/142; H01F 10/28; H01F 41/16; H01F 41/32; H01F 1/12; H01F 1/20; H01F 1/14733; H01F 1/14766; H01F 1/14708; H01F 1/15308; Y10T 428/12021; Y10T 428/12181; Y10T 428/12465; Y10T 428/2991
USPC ........ 427/128, 132, 201, 216, 217; 428/546, 428/547, 570, 403
See application file for complete search history.

(56) References Cited

U.S. PATENT DOCUMENTS

| | | | | |
|---|---|---|---|---|
| 2008/0041496 | A1 | 2/2008 | Maeda et al. | |
| 2009/0004475 | A1* | 1/2009 | Sadaka | H01F 1/24 428/403 |
| 2009/0065100 | A1 | 3/2009 | Yoshizawa et al. | |
| 2010/0212455 | A1 | 8/2010 | Ohwaki et al. | |
| 2011/0024670 | A1 | 2/2011 | Otsuki et al. | |
| 2011/0285486 | A1 | 11/2011 | Maeda et al. | |
| 2013/0298730 | A1* | 11/2013 | Ikeda | B22F 1/02 75/230 |
| 2014/0138569 | A1* | 5/2014 | Otsuka | H01F 1/24 252/62.54 |

FOREIGN PATENT DOCUMENTS

| | | | |
|---|---|---|---|
| JP | 11-158502 | | 6/1999 |
| JP | 11-256202 | | 9/1999 |
| JP | 2000-129307 | A | 5/2000 |
| JP | 2001-068324 | A | 3/2001 |
| JP | 2002-050511 | A | 2/2002 |
| JP | 2005-294458 | A | 10/2005 |
| JP | 2005-303006 | A | 10/2005 |
| JP | 2006-176817 | A | 7/2006 |
| JP | 2007-182594 | A | 7/2007 |
| JP | 2008-258234 | A | 10/2008 |
| JP | 2009-164401 | A | 7/2009 |
| JP | 2009-302420 | A | 12/2009 |
| JP | 2010-118486 | A | 5/2010 |
| JP | 2010-153638 | A | 7/2010 |
| JP | 2010-232223 | A | 10/2010 |
| JP | 2010-232224 | A | 10/2010 |
| JP | 2010-232225 | A | 10/2010 |
| JP | 2012-138494 | A | 7/2012 |
| WO | WO-2010-084812 | A1 | 7/2010 |
| WO | WO-2012-115137 | A1 | 8/2012 |

OTHER PUBLICATIONS

Ferroxcube, Safety Data Sheet (Revision date 2015).*

* cited by examiner

COMPOSITE PARTICLE OF SOFT-MAGNETIC METALLIC MATERIAL, METHOD FOR PRODUCING COMPOSITE PARTICLE, POWDER CORE, MAGNETIC ELEMENT, AND PORTABLE ELECTRONIC DEVICE

BACKGROUND

1. Technical Field

The present invention relates to a composite particle, a method for producing a composite particle, a powder core, a magnetic element, and a portable electronic device.

2. Related Art

Recently, the reduction in the size and weight of mobile devices such as notebook personal computers has become significant. Further, it has been planned to improve the performance of notebook personal computers to such an extent that they are equivalent to the performance of desktop personal computers.

In order to reduce the size and improve the performance of mobile devices in this manner, it is necessary to increase the frequency of a switching power supply. At present, the driving frequency of a switching power supply has been increased to about several hundred kilo hertz, however, accompanying this, it is necessary to also increase the driving frequency of a magnetic element such as a choke coil or an inductor which is built into a mobile device in response to the increase in frequency of the switching power supply.

For example, JP-A-2007-182594 discloses a ribbon composed of an amorphous alloy containing Fe, M (provided that M is at least one element selected from Ti, V, Zr, Nb, Mo, Hf, Ta, and W), Si, B, and C. It also discloses a magnetic core produced by laminating this ribbon and processing the resulting laminate by punching or the like. It is expected that with such a magnetic core, the AC magnetic properties are improved.

However, in the magnetic core produced from the ribbon, a significant increase in Joule loss due to an eddy current (an eddy current loss) may not be avoided in the case where the driving frequency of a magnetic element is further increased.

In order to solve such a problem, a powder core obtained by press-molding a mixture of a soft magnetic powder and a binding material (a binder) is used. In the powder core, a path in which an eddy current is generated is cut, and therefore, an attempt is made to reduce the eddy current loss.

Further, in the powder core, by binding the soft magnetic powder particles to one another with the binder, insulation is provided between the particles and the shape of the magnetic core is maintained. On the other hand, if the amount of the binder is too much, a decrease in the magnetic permeability of the powder core is inevitable.

Therefore, JP-A-2010-118486 proposes that such a problem is solved by using a mixed powder of an amorphous soft magnetic powder and a crystalline soft magnetic powder. That is, since an amorphous metal has a higher hardness than a crystalline metal, by subjecting a crystalline soft magnetic powder to plastic deformation when performing compression-molding, it is possible to improve the packing ratio and increase the magnetic permeability.

However, depending on the composition of the amorphous soft magnetic powder or the crystalline soft magnetic powder, the particle diameter thereof, or the like, the packing ratio sometimes cannot be sufficiently increased due to a problem of segregation of particles, uneven dispersion thereof, and the like.

SUMMARY

An advantage of some aspects of the invention is to provide a composite particle capable of producing a powder core having a high packing ratio and a high magnetic permeability, a method for producing a composite particle capable of efficiently producing such a composite particle, a powder core produced using this composite particle, a magnetic element including this powder core, and a portable electronic device including this magnetic element.

An aspect of the invention is directed to a composite particle including a particle composed of a soft magnetic metallic material, and a coating layer composed of a soft magnetic metallic material having a different composition from that of the particle and fusion-bonded to the particle so as to cover the particle, wherein when the Vickers hardness of the particle is represented by HV1 and the Vickers hardness of the coating layer is represented by HV2, HV1 and HV2 satisfy the following relationship: $100 \leq HV1-HV2$, and when half of the projected area circle equivalent diameter of the particle is represented by r and the average thickness of the coating layer is represented by t, r and t satisfy the following relationship: $0.05 \leq t/r \leq 1$.

According to this, when an aggregate of the composite particles (a composite particle powder) is compressed and molded, the particles and the coating layers are uniformly distributed, and also the coating layer can move such that it is deformed and penetrates into a gap between the particles, and therefore, a composite particle capable of producing a powder core having a high packing ratio and a high magnetic permeability is obtained.

It is preferred that in the composite particle according to the aspect of the invention, HV1 and HV2 satisfy the following relationships: $250 \leq HV1 \leq 1200$ and $100 \leq HV2 < 250$, respectively.

According to this, a composite particle in which the coating layer can moderately penetrate into a gap between the particles when the composite particles are compressed is obtained.

It is preferred that in the composite particle according to the aspect of the invention, the soft magnetic metallic material constituting the particle and the soft magnetic metallic material constituting the coating layer are each a crystalline metallic material, and the average crystal grain size in the particle as measured by X-ray diffractometry is 0.2 times or more and 0.95 times or less the average crystal grain size in the coating layer as measured by X-ray diffractometry.

According to this, the balance in hardness between the particle and the coating layer can be further optimized. That is, when the composite particles are compressed, the coating layer is moderately deformed, whereby the packing ratio of the powder core can be particularly increased.

It is preferred that in the composite particle according to the aspect of the invention, the soft magnetic metallic material constituting the particle is an amorphous metallic material or a nanocrystalline metallic material, and the soft magnetic metallic material constituting the coating layer is a crystalline metallic material.

According to this, the particle has a high hardness, a high toughness, and a high specific resistance, and the coating layer has a relatively low hardness, and therefore, the above-described metallic materials are useful as the constituent materials of these members.

It is preferred that in the composite particle according to the aspect of the invention, the soft magnetic metallic material constituting the particle is an Fe—Si-based material.

According to this, a particle having a high magnetic permeability and a relatively high toughness is obtained.

It is preferred that in the composite particle according to the aspect of the invention, the soft magnetic metallic material constituting the coating layer is any of pure Fe, an Fe—B-based material, an Fe—Cr-based material, and an Fe—Ni-based material.

According to this, a coating layer having a relatively low hardness and a relatively high toughness is obtained.

It is preferred that in the composite particle according to the aspect of the invention, the coating layer covers the entire surface of the particle.

According to this, a powder core having a high packing ratio can be obtained while suppressing a decrease in mechanical properties in a molded body such as a powder core to be produced from the composite particles.

Another aspect of the invention is directed to a method for producing a composite particle, wherein the composite particle includes a particle composed of a soft magnetic metallic material and a coating layer composed of a soft magnetic metallic material having a different composition from that of the particle and fusion-bonded to the particle so as to cover the particle, and when the Vickers hardness of the particle is represented by HV1 and the Vickers hardness of the coating layer is represented by HV2, HV1 and HV2 satisfy the following relationship: $100 \leq HV1-HV2$, and when half of the projected area circle equivalent diameter of the particle is represented by r and the average thickness of the coating layer is represented by t, r and t satisfy the following relationship: $0.05 \leq t/r \leq 1$. The method includes forming the coating layer by fusion-bonding coating particles having a smaller diameter than the particle to the surface of the particle through mechanical pressure welding.

According to this, the coating layer is more firmly fusion-bonded to the particle. Due to this, even when the composite particles are compressed and molded, the coating layer is prevented from being detached, and thus, this contributes to the achievement of a powder core, which has a high packing ratio, and in which the particles and the coating layers are more uniformly distributed. Therefore, according to the aspect of the invention, such a composite particle can be efficiently produced.

It is preferred that in the method for producing a composite particle according to the aspect of the invention, the coating particles are fusion-bonded to the particle so as to cover the surface of the particle.

According to this, when a powder core is obtained by compressing and molding the composite particles, the particles and the coating layers can be uniformly distributed in the entire powder core, and also the coating layer can be deformed and allowed to penetrate into a gap between the particles. Therefore, a composite particle capable of further increasing the packing ratio of the soft magnetic metallic material in the entire powder core can be produced.

Still another aspect of the invention is directed to a powder core including a compressed powder body obtained by compression-molding composite particles each including a particle composed of a soft magnetic metallic material and a coating layer composed of a soft magnetic metallic material having a different composition from that of the particle and fusion-bonded to the particle so as to cover the particle and a binding material which binds the composite particles, wherein when the Vickers hardness of the particle is represented by HV1 and the Vickers hardness of the coating layer is represented by HV2, HV1 and HV2 satisfy the following relationship: $100 \leq HV1-HV2$, and when half of the projected area circle equivalent diameter of the particle is represented by r and the average thickness of the coating layer is represented by t, r and t satisfy the following relationship: $0.05 \leq t/r \leq 1$.

According to this, a powder core having a high packing ratio and a high magnetic permeability is obtained.

Yet another aspect of the invention is directed to a magnetic element including the powder core according to the aspect of the invention.

According to this, a magnetic element whose reliability is high is obtained.

Still yet another aspect of the invention is directed to a portable electronic device including the magnetic element according to the aspect of the invention.

According to this, a portable electronic device whose reliability is high is obtained.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a composite particle, a method for producing a composite particle, a powder core, a magnetic element, and a portable electronic device according to embodiments of the invention will be described in detail based on preferred embodiments shown in the accompanying drawings.

Composite Particle

The composite particle according to an embodiment of the invention includes a core particle composed of a soft magnetic metallic material and a coating layer composed of a soft magnetic metallic material having a different composition from that of the core particle and fusion-bonded to the core particle so as to cover the core particle, and a powder which is an aggregate of such composite particles is used as a starting material of a powder core or the like as a soft magnetic powder.

Hereinafter, the composite particle will be described in more detail.

Figure 1:
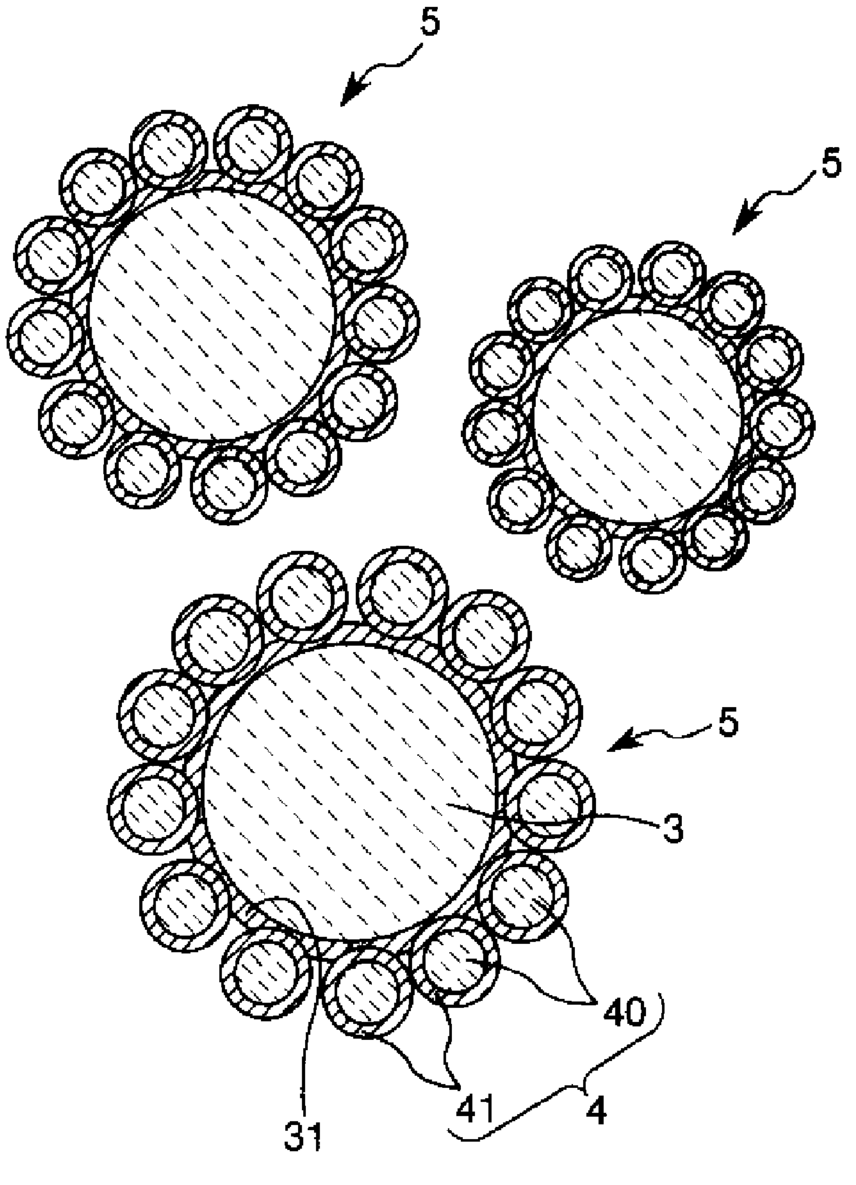
FIG. 1 is a cross-sectional view showing a composite particle according to an embodiment of the invention.
Figure 2:
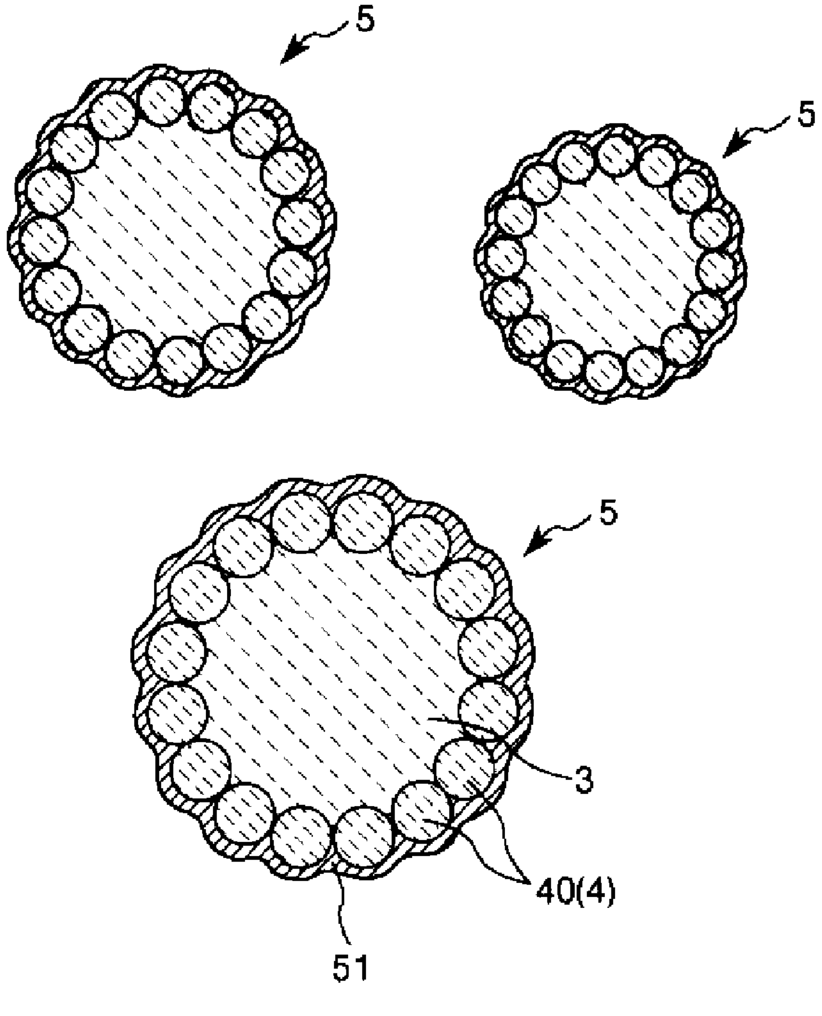
FIG. 2 is a cross-sectional view showing a composite particle according to an embodiment of the invention.

FIGS. 1 and 2 are each a cross-sectional view showing a composite particle according to an embodiment of the invention.

As shown in FIG. 1, a composite particle 5 includes a core particle 3 and a coating layer 4 fusion-bonded to the core particle 3 so as to cover the periphery thereof. The term "fusion-bonded" as used herein refers to a state where the core particle 3 and the coating layer 4 are fused to each other through a chemical bond such as a covalent bond, an ionic bond, a metallic bond, or a hydrogen bond by subjecting the core particle 3 and a starting material of the coating layer 4 to mechanical pressure welding or the like to temporarily melt the base materials.

The coating layer 4 may be a simple film composed of a soft magnetic metallic material, but may be a layer-shaped aggregate of a plurality of coating particles 40 as shown in FIG. 1. These coating particles 40 are distributed so as to cover the core particle 3 and also are fusion-bonded to the surface of the core particle 3.

Further, the core particle 3 according to this embodiment is covered with an insulating layer 31 as shown in FIG. 1. On the other hand, also the coating particle 40 is covered with an insulating layer 41 as shown in FIG. 1.

Such a composite particle 5 satisfies a predetermined relationship in hardness, particle diameter, and layer thickness between the core particle 3 and the coating layer 4 (coating particle 40).

Specifically, the core particle 3 is composed of a soft magnetic metallic material, and when the Vickers hardness of the core particle 3 is represented by HV1, and on the other hand, the coating layer 4 is composed of a soft magnetic metallic material different from that of the core particle 3, and when the Vickers hardness of the coating layer 4 is represented by HV2, the composite particle 5 satisfies the following relationship: $100 \leq HV1-HV2$.

Further, the composite particle 5 is configured such that when half of the projected area circle equivalent diameter (radius) of the core particle 3 is represented by r and the average thickness of the coating layer 4 is represented by t, r and t satisfy the following relationship: $0.05 \leq t/r \leq 1$.

The composite particle 5 that satisfies such a relationship can produce a powder core having a high packing ratio when the composite particles 5 are compressed and molded into a powder core or the like. This is because since the coating layer 4 is provided so as to cover the core particle 3, these members can be uniformly distributed in the entire powder core, and also since a difference in hardness between the core particle 3 and the coating layer 4 is optimized, the coating layer 4 is deformed and penetrates into a gap between the core particles 3, whereby the packing ratio of the soft magnetic metallic material is increased in the entire powder core. As a result, the overall packing ratio becomes more uniform and is further increased, and accordingly, a powder core having a high magnetic permeability and a high saturation magnetic flux density is obtained.

That is, in the case where the coating layer 4 is not provided, and a mixed powder obtained by merely mixing two types of particles is used as in the related art, the two types of particles are unevenly distributed when the mixed powder is compressed, and as a result, a large gap may be left between the core particles. On the other hand, it is considered that according to the disclosure, the packing ratio is improved by the reliable penetration of the deformed coating layer 4 into this gap. Further, at this time, if the coating layer 4 is not sufficiently deformed, a large gap may be generated between the core particle 3 and the coating layer 4, but in the case where the coating layer 4 is moderately deformed, the packing performance thereof into the gap is improved, and thus, the overall packing ratio can be further increased.

Further, since the average thickness of the coating layer 4 with respect to the equivalent circle diameter of the core particle 3 is set in a predetermined range, the coating layer 4 in an amount necessary and sufficient for penetrating into a gap between the core particles 3 is ensured. Due to this, in the case where, for example, as the constituent material of the core particle 3, a material having a high magnetic permeability and a high saturation magnetic flux density although having a low toughness is used, by providing the coating layer 4 in such a necessary and sufficient amount, a composite particle 5 capable of making the most use of the advantages such as a high magnetic permeability and a high saturation magnetic flux density while compensating for the disadvantage of low toughness is obtained.

Further, since the coating layer 4 is fusion-bonded to the core particle 3, even when the composite particles 5 are compressed, the coating layer 4 is hardly detached by the compression load. Due to this, a powder core having a particularly high packing ratio can be obtained without unevenly distributing two types of materials unlike the related art.

In the case where HV1−HV2 is below the above-described lower limit, a difference between HV1 and HV2 is not sufficiently ensured, and even when a compression load is applied to the composite particles 5, the coating layer 4 cannot be moderately deformed, and therefore, the coating layer 4 cannot penetrate into a gap between the core particles 3.

Further, HV1−HV2 preferably satisfies the following relationship: $125 \leq HV1-HV2 \leq 700$, more preferably satisfies the following relationship: $150 \leq HV1-HV2 \leq 500$. In the case where HV1−HV2 exceeds the above-described upper limit, the coating layer 4 is excessively deformed depending on the particle diameter of the core particle 3 or the thickness of the coating layer 4, and the like, and the coating layer 4 may be cut off by the core particle 3.

Further, HV1 preferably satisfies the following relationship: $250 \leq HV1 \leq 1200$, more preferably satisfies the following relationship: $300 \leq HV1 \leq 1100$, further more preferably satisfies the following relationship: $350 \leq HV1 \leq 1000$. Further, HV2 preferably satisfies the following relationship: $100 \leq HV2 \leq 250$, more preferably satisfies the following relationship: $125 \leq HV2 \leq 225$, further more preferably satisfies the following relationship: $150 \leq HV2 \leq 200$. In the composite particles 5 having such a hardness, a suitable amount of the coating layer 4 can penetrate into a gap between the core particles 3 when the composite particles 5 are compressed.

In the case where the Vickers hardness HV1 of the core particle 3 is below the above-described lower limit, when the composite particles are compressed, the core particles 3 are largely deformed more than necessary depending on the constituent material of the coating layer 4, and thus, a state where the core particles 3 and the coating layers 4 are uniformly distributed may be deteriorated. This may lead to a decrease in the packing ratio of the soft magnetic metallic material in the powder core. Further, in the case where the Vickers hardness HV1 of the core particle 3 exceeds the above-described upper limit, when the composite particles are compressed, the coating layer 4 is largely deformed more than necessary this time depending on the constituent material of the coating layer 4, and thus, a state where the core particles 3 and the coating layers 4 are uniformly distributed may be deteriorated just the same.

On the other hand, also in the case where the Vickers hardness HV2 of the coating layer 4 is below the above-described lower limit, when the composite particles are compressed, the coating layer 4 is largely deformed more than necessary depending on the constituent material of the core particle 3, and thus, a state where the core particles 3 and the coating layers 4 are uniformly distributed may be deteriorated. Further, also in the case where the Vickers hardness HV2 of the coating layer 4 exceeds the above-described upper limit, when the composite particles are compressed, the core particle 3 may be largely deformed more than necessary depending on the constituent material of the core particle 3.

The Vickers hardness HV1 or HV2 is calculated on the basis of the size of the cross-sectional area of an indentation formed by pressing an indenter onto a surface or a cross section of the core particle 3 or the coating layer 4, the load applied when pressing the indenter, and the like. In the measurement, for example, a micro-Vickers hardness tester or the like is used.

Further, t/r preferably satisfies the following relationship: $0.1 \le t/r \le 0.9$, more preferably satisfies the following relationship: $0.2 \le t/r \le 0.8$.

Further, t is preferably 40 μm or more and 90 μm or less, more preferably 45 μm or more and 80 μm or less.

In the case where the half r of the projected area circle equivalent diameter of the core particle 3 is below the above-described lower limit, when the composite particles 5 are compressed, it becomes difficult to press the coating layer 4 against the core particle 3 depending on the thickness of the coating layer 4, and thus, it becomes difficult to maintain the state where the coating layer 4 is distributed so as to cover the core particle 3. Further, in the case where the half r of the projected area circle equivalent diameter of the core particle 3 exceeds the above-described upper limit, a gap between the core particles 3 is inevitably increased depending on the thickness of the coating layer 4, and as a result, when the composite particles 5 are compressed and molded into a powder core or the like, the packing ratio tends to be low.

The half r of the projected area circle equivalent diameter of the core particle 3 is calculated as a radius of a circle having the same area as that of an image of the core particle 3 obtained by capturing an image of the composite particle 5 with a light microscope, an electron microscope, or the like.

Similarly, the average thickness t of the coating layer 4 is calculated as an average of thicknesses at 10 sites obtained by calculation of the thickness from an image corresponding to the coating layer 4 in an image of the composite particle 5.

The circularity of the core particle 3 is preferably 0.5 or more and 1 or less, more preferably 0.6 or more and 1 or less. The core particle 3 having such circularity is relatively close to a true sphere, and therefore, also the composite particle 5 has a relatively high fluidity. Due to this, when the composite particles 5 are compressed and molded into a powder core or the like, the composite particles 5 are rapidly packed, and thus, a powder core having a high packing ratio, a high magnetic permeability, and the like is obtained.

With respect to a powder composed of the composite particles 5, when a 50% cumulative particle diameter counted from a smaller diameter side in a cumulative particle size distribution on a mass basis as measured by a laser diffraction/scattering method is defined as D50, D50 is preferably 50 μm or more and 500 μm or less, more preferably 80 μm or more and 400 μm or less. Such a composite particle 5 is preferred from the viewpoint of producing a powder core having a high packing ratio since the particle diameter of the core particle 3 and the thickness of the coating layer 4 are better balanced.

Further, with respect to a powder composed of the composite particles 5, when 10% and 90% cumulative particle diameters counted from a smaller diameter side in a cumulative particle size distribution on a mass basis as measured by a laser diffraction/scattering method are defined as D10 and D90, respectively, (D90−D10)/D50 is preferably 0.5 or more and 3.5 or less, more preferably 0.8 or more and 3 or less. Such a composite particle 5 is preferred particularly from the viewpoint of producing a powder core having a high packing ratio since the balance between the particle diameter of the core particle 3 and the thickness of the coating layer 4 is moderately maintained, and above all, a variation in the particle diameter of the composite particle 5 is small.

Here, the soft magnetic metallic material constituting the core particle 3 is not particularly limited as long as it has a higher Vickers hardness than the soft magnetic metallic material constituting the coating layer 4, and examples thereof include various Fe-based materials such as pure Fe, silicon steel (an Fe—Si-based material), permalloy (an Fe—Ni-based material), supermalloy, permendur (an Fe—Co-based material), Fe—Si—Al-based materials such as Sendust, Fe—Cr—Si-based materials, Fe—Cr-based materials, Fe—B-based materials, and ferrite-based stainless steel, and also various Ni-based materials, various Co-based materials, and various amorphous metallic materials. A composite material containing one or more types thereof may also be used.

Among these, an Fe—Si-based material is preferably used. The Fe—Si-based material has a high magnetic permeability and a relatively high toughness, and therefore is useful as the soft magnetic metallic material constituting the core particle 3.

Also as the soft magnetic metallic material constituting the coating layer 4, for example, the above-described soft magnetic metallic materials are used.

Among these, any of pure Fe, an Fe—B-based material, an Fe—Cr-based material, and an Fe—Ni-based material is preferably used. These materials have a relatively low hardness and a relatively high toughness, and therefore are useful as the soft magnetic metallic material constituting the coating layer 4. The "pure Fe" as used herein refers to iron containing extremely low amounts of carbon and other impurity elements, and the impurity content is 0.02% by mass or less.

As for the constituent materials of the core particle 3 and the coating layer 4, a case where both of the core particle 3 and the coating layer 4 are composed of a crystalline soft magnetic metallic material, or a case where the core particle 3 is composed of an amorphous or nanocrystalline soft magnetic metallic material, and the coating layer 4 is composed of a crystalline soft magnetic metallic material can be exemplified.

Of these, the former is a case where both of the core particle 3 and the coating layer 4 are composed of a crystalline soft magnetic metallic material. In this case, the hardness, toughness, specific resistance, and the like of both of the core particle and the coating layer can be controlled to be uniform by suitably changing the condition for an annealing treatment, and the like to adjust the crystal grain size, and thus, a powder core having a high packing ratio can be obtained. Accordingly, the crystalline soft magnetic metallic material is useful as the constituent material of the core particle 3 and the coating layer 4.

The average grain size of the crystalline structure present in the core particle 3 is preferably 0.2 times or more and 0.95 times or less, more preferably 0.3 times or more and 0.9 times or less the average grain size of the crystalline structure present in the coating layer 4. According to this, the balance in hardness between the core particle 3 and the coating layer 4 can be further optimized. That is, when the composite particles 5 are compressed, the coating layer 4 is moderately deformed, whereby the packing ratio of the powder core can be particularly increased. In the case where the average grain size of the crystalline structure is below the above-described lower limit, the formation of such a crystalline structure in a stable manner while suppressing a variation in grain size is sometimes accompanied by difficulty in adjusting the production condition.

The average grain size of such a crystalline structure can be calculated from the width of a diffraction peak obtained by, for example, X-ray diffractometry.

Further, the average grain size of the crystalline structure present in the coating layer 4 is preferably 30 μm or more and 200 μm or less, more preferably 40 μm or more and 180 μm or less. The coating layer 4 having such an average grain size is optimized particularly in terms of hardness, and also the toughness, specific resistance, and the like thereof are further optimized from the viewpoint that the composite particle 5 is applied to use in a powder core, and the like.

The latter is a case where the core particle 3 is composed of an amorphous or nanocrystalline soft magnetic metallic material, and the coating layer 4 is composed of a crystalline soft magnetic metallic material. In this case, the hardness, toughness, and specific resistance of the amorphous or nanocrystalline material are very high, and therefore, the amorphous or nanocrystalline material is useful as the constituent material of the core particle 3. On the other hand, the hardness of the crystalline material is relatively low, and therefore, the crystalline material is useful as the constituent material of the coating layer 4.

The “amorphous soft magnetic metallic material” as used herein refers to a material for which diffraction peaks are not detected when an X-ray diffraction spectrum of the core particle 3 is obtained. The “nanocrystalline soft magnetic metallic material” as used herein refers to a material in which the average grain size of the crystalline structure as measured by X-ray diffractometry is less than 1 μm, and the “crystalline soft magnetic metallic material” as used herein refers to a material in which the average grain size of the crystalline structure as measured by X-ray diffractometry is 1 μm or more.

Examples of the amorphous soft magnetic metallic material include Fe—Si—B-based, Fe—B-based, Fe—Si—B—C-based, Fe—Si—B—Cr-based, Fe—Si—B—Cr—C-based, Fe—Co—Si—B-based, Fe—Zr—B-based, Fe—Ni—Mo—B-based, and Ni—Fe—Si—B-based materials.

As the nanocrystalline soft magnetic metallic material, for example, a microcrystal of nanometer order deposited by crystallization of an amorphous soft magnetic metallic material is used.

The coating layer 4 preferably covers the entire surface of the core particle 3, but may cover a part of the surface thereof. In this case, the coating layer 4 covers preferably at least 50% of the surface of the core particle 3, more preferably at least 70% thereof. Particularly, in the case where the coating layer 4 covers at least 70% thereof, it is considered that theoretically, a state in which the coating layer 4 can be no more directly adhered to the surface of the core particle 3 has been reached. That is, such a state can be regarded as a state in which the coating layer 4 covers substantially the entire surface of the core particle 3. In such a state, a powder core having a high packing ratio can be obtained while suppressing a decrease in mechanical property in a molded body such as a powder core.

The core particle 3 shown in FIG. 1 is covered with the insulating layer 31 as described above, and the coating particle 40 is covered with the insulating layer 41 as described above.

Examples of the constituent material of the insulating layers 31 and 41 include inorganic binders including phosphates such as magnesium phosphate, calcium phosphate, zinc phosphate, manganese phosphate, and cadmium phosphate, silicates (liquid glass) such as sodium silicate, soda-lime glass, borosilicate glass, lead glass, aluminosilicate glass, borate glass, and sulfate glass. Such an inorganic binder has a particularly excellent insulating ability, and therefore can decrease the Joule loss due to an induction current to particularly a low level. Further, an inorganic binder has a relatively high hardness, and therefore, the insulating layers 31 and 41 composed of an inorganic binder are hardly cut off even when the composite particles 5 are compressed. In addition, by providing the insulating layers 31 and 41 composed of an inorganic binder, the adhesiveness and affinity between the respective particles composed of a metallic material and the insulating layers are improved, and the insulating performance between the particles can be particularly enhanced.

The average thickness of each of the insulating layers 31 and 41 is preferably 0.3 μm or more and 10 μm or less, more preferably 0.5 μm or more and 8 μm or less. According to this, a decrease in the overall magnetic permeability and the like can be suppressed while sufficiently insulating between the core particle 3 and the coating particle 40.

The insulating layers 31 and 41 may not cover the entire surfaces of the core particle 3 and the coating particle 40, and may cover only a part thereof.

Further, the insulating layers 31 and 41 may be provided as needed. For example, as shown in FIG. 2, in place of the omitted insulating layers 31 and 41, an insulating layer 51 similar to the insulating layers 31 and 41 may be provided so as to cover the entire composite particle 5. By doing this, the insulating layer can ensure the insulation between the composite particles 5 and also reinforce the composite particles 5 to prevent the composite particles 5 from being fractured when the composite particles 5 are compressed. Such an insulating layer 51 covering the entire composite particle 5 can also be constituted in the same manner as the insulating layers 31 and 41.

The core particle 3 and the coating particle 40 as described above are produced by, for example, any of various powdering processes such as an atomization process (such as a water atomization process, a gas atomization process, or a spinning water atomization process), a reduction process, a carbonyl process, and a pulverization process.

The core particle 3 and the coating particle 40 are preferably produced by an atomization process among the above-described processes, and more preferably produced by a water atomization process or a spinning water atomization process. The atomization process is a process in which a metal powder is produced by causing a molten metal (a metal melt) to collide with a fluid (a liquid or a gas) sprayed at a high speed to atomize the metal melt, followed by cooling. By producing the core particle 3 and the coating particle 40 through such an atomization process, a powder having a shape closer to a sphere and having a uniform particle diameter can be efficiently produced. Due to this, by using such core particles 3 and coating particles 40, a powder core having a high packing ratio and a high magnetic permeability is obtained.

In the case where a water atomization process is used as the atomization process, the pressure of water to be sprayed to the molten metal (hereinafter referred to as "atomization water") is not particularly limited, but is preferably about 75 MPa or more and 120 MPa or less (750 $kgf/cm^2$ or more and 1200 $kgf/cm^2$ or less), more preferably about 90 MPa or more and 120 MPa or less (900 $kgf/cm^2$ or more and 1200 $kgf/cm^2$ or less).

The temperature of the atomization water is also not particularly limited, but is preferably about 10° C. or higher and 20° C. or lower.

The atomization water is often sprayed in a cone shape such that it has a vertex on the fall path of the metal melt and the outer diameter gradually decreases downward. In this case, the vertex angle θ of the cone formed by the atomization water is preferably about 10° or more and 40° or less, more preferably about 15° or more and 35° or less. According to this, a soft magnetic powder having a composition as described above can be reliably produced.

Further, the obtained core particle 3 and coating particle 40 may be subjected to an annealing treatment as needed.

Method for Producing Composite Particle

Next, a method for producing the composite particle 5 shown in FIG. 1 (the method for producing a composite particle according to an embodiment of the invention) will be described.

[1] First, the insulating layer 31 is formed for the core particle 3. When forming the insulating layer 31, for example, a method in which a liquid obtained by dissolving or dispersing a starting material is applied to the surface of the core particle 3 may be used, but preferably a method in which a starting material is mechanically adhered thereto is used. By doing this, the insulating layer 31 having high adhesiveness to the core particle 3 is obtained.

When forming the insulating layer 31 by mechanically adhering a starting material, for example, a device which causes mechanical compression and friction for a mixture of the core particles 3 and the starting material of the insulating layer 31 is used. Specifically, any type of pulverizer such as a hammer mill, a disk mill, a roller mill, a ball mill, a planetary mill, or a jet mill, or a high-speed impact type mechanical particle compounding device such as Hybridization (registered trademark) or Cryptron (registered trademark), a compression shear type mechanical particle compounding device such as Mechanofusion (registered trademark) or Theta Composer (registered trademark), a mixing shear friction type mechanical particle compounding device such as Mechanomill, CF Mill, or a friction mixer, or the like is used. By causing compression and friction using such a device, the starting material (solid) of the insulating layer 31 is softened or melted and uniformly and firmly adhered to the surface of the core particle 3, whereby the insulating layer 31 covering the core particle 3 is formed. Further, even if the core particle 3 has an indented surface, by pressing the starting material against the surface of the core particle 3, the insulating layer 31 having a uniform thickness can be formed irrespective of the indented surface. Since a liquid is not used, the insulating layer 31 can be formed under a dry condition or in an inert gas atmosphere, and thus, the degradation or deterioration of the core particle 3 by moisture can be suppressed.

At this time, it is preferred to adjust the compression condition and the friction condition so that the core particle 3 is not deformed or the like as much as possible while forming the insulating layer 31. By doing this, in the step described below, the coating particles 40 can be efficiently fusion-bonded to the core particle 3.

In the case where the above-described inorganic binder is used as the constituent material of the insulating layer 31, the softening point thereof is preferably about 100° C. or higher and 500° C. or lower.

Further, since the action of compression and friction works when forming the insulating layer 31, even if a foreign substance, a passive film, or the like is adhered to the surface of the core particle 3, the insulating layer 31 can be formed while removing such a material, and thus, the adhesiveness is improved.

It is also possible to form the insulating layer 41 for the coating particle 40 in the same manner as described above. Also in this case, it is preferred to adjust the compression condition and the friction condition so that the coating particle 40 is not deformed or the like as much as possible while forming the insulating layer 41.

[2] Subsequently, the coating particles 40 having the insulating layer 41 formed thereon are fusion-bonded to the core particles 3 having the insulating layer 31 formed thereon by pressure welding. By doing this, the coating layer 4 composed of the insulating layers 41 and the coating particles 40 is formed so as to cover the core particle 3 having the insulating layer 31 formed thereon, whereby the composite particle 5 is obtained.

Also when fusion-bonding the coating particles 40, for example, a device which causes mechanical compression and friction as described above is used. That is, the core particles 3 having the insulating layer 31 formed thereon and the coating particles 40 having the insulating layer 41 formed thereon are fed to the device to achieve fusion-bonding by the action of compression and friction. At this time, a load at which a member that has an action of compression and friction in the device presses a material to be treated varies depending on the size or the like of the device, but is, for example, about 30 N or more and 500 N or less. Further, in the case where a member that has an action of compression and friction presses a material to be treated while rotating in the device, the rotation speed of the member is preferably adjusted at about 300 rpm or more and 1200 rpm or less.

By causing such compression and friction, the coating particles 40 are deformed along the surface of each core particle 3 having the insulating layer 31 formed thereon and fusion-bonded thereto while maintaining the particle shape thereof. At this time, since the coating particle 40 has a smaller diameter than the core particle 3, the coating particles 40 are distributed so as to dodge the core particles 3. As a result, the coating particles 40 are uniformly distributed such that they cover the core particles 3. The composite particles 5 are obtained in this manner, and these composite particles 5 contribute to an increase in the overall packing ratio when they are compressed and molded. Eventually, the composite particles 5 contribute to the production of a powder core having excellent magnetic properties such as magnetic permeability and saturation magnetic flux density.

Further, according to this method, the coating particles 40 can be more firmly fusion-bonded, and thus, the coating particles 40 are hardly detached. Due to this, the coating particles 40 can be prevented from being detached when the composite particles 5 are compressed and molded or the like, and a powder core, which has a high packing ratio, and in which the core particles 3 and the coating layers 4 are more uniformly distributed, can be obtained.

Incidentally, the fusion-bonding between the core particles 3 having the insulating layer 31 formed thereon and the coating particles 40 having the insulating layer 41 formed thereon includes fusion-bonding between the insulating layer 31 and the insulating layer 41 and fusion-bonding between the core particle 3 and the coating particle 40.

Further, in the composite particle 5 shown in FIG. 1, the coating particles 40 constitute the coating layer 4 in a state where the coating particles 40 maintain the shape as particles, however, the coating particles 40 may not necessarily maintain the shape as particles. That is, when the coating particles 40 are connected to one another to form the coating layer 4, it does not matter if the coating particles 40 are fusion-bonded to one another so as to lose the shape as particles.

When fusion-bonding the coating particles 40, a lubricant may be used as needed. This lubricant can reduce the frictional resistance between the core particle 3 and the coating particle 40, and therefore can suppress heat generation or the like when forming the composite particles 5. Due to this, oxidation of the core particle 3 and the coating particle 40, and the like accompanying heat generation can be suppressed. Further, by exuding the lubricant when compression-molding the composite particles 5, a defect such as mold galling can be suppressed. As a result, the composite particle 5 capable of efficiently producing a high-quality powder core is obtained.

Examples of the constituent material of the lubricant include compounds (metal salts of fatty acids) of higher fatty acids such as lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid with metals such as Li, Na, Mg, Ca, Sr, Ba, Zn, Cd, Al, Sn, Pb, and Cd; silicone-based compounds such as dimethylpolysiloxanes and modified products thereof, carboxyl-modified silicones, α-methylstyrene-modified silicones, α-olefin-modified silicones, polyether-modified silicones, fluorine-modified silicones, specially modified hydrophilic silicones, olefin polyether-modified silicones, epoxy-modified silicones, amino-modified silicones, amide-modified silicones, and alcohol-modified silicones; and natural or synthetic resin derivatives such as paraffin wax, microcrystalline wax, and carnauba wax. Among these, one type or two or more types in combination may be used.

Powder Core and Magnetic Element

The magnetic element according to an embodiment of the invention can be applied to a variety of magnetic elements provided with a magnetic core such as a choke coil, an inductor, a noise filter, a reactor, a transformer, a motor, and an electric generator. Further, the powder core according to an embodiment of the invention can be applied to magnetic cores provided in these magnetic elements.

Hereinafter, two types of choke coils will be described as representative examples of the magnetic element.

First Embodiment

First, a choke coil to which a magnetic element according to a first embodiment of the invention is applied will be described.

Figure 3:
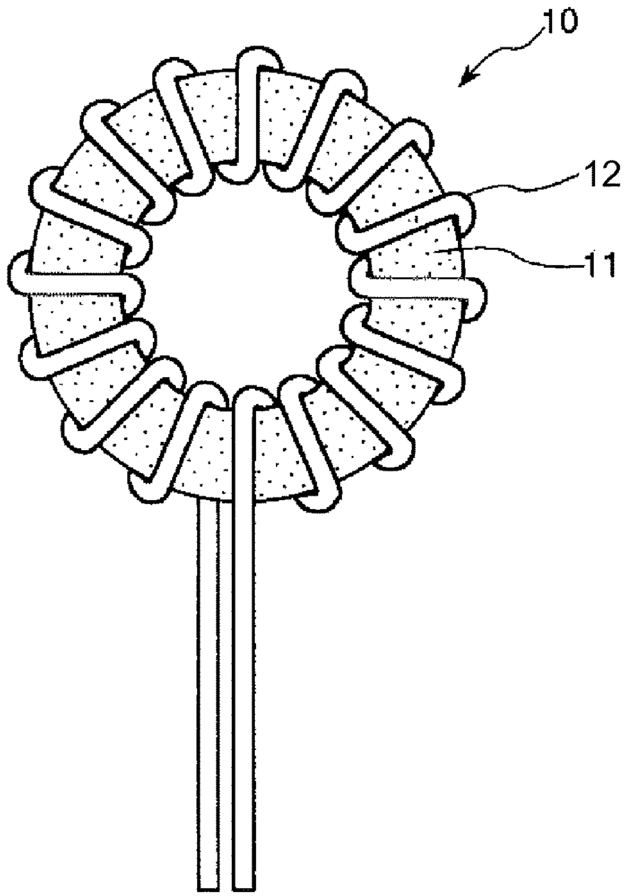
FIG. 3 is a schematic view (a plan view) showing a choke coil, to which a magnetic element according to a first embodiment of the invention is applied.

FIG. 3 is a schematic view (a plan view) showing a choke coil to which a magnetic element according to a first embodiment of the invention is applied.

A choke coil 10 shown in FIG. 3 includes a ring-shaped (toroidal) powder core 11 and a conductive wire 12 wound around the powder core 11. Such a choke coil 10 is generally referred to as "toroidal coil".

The powder core 11 is obtained by mixing a powder composed of the composite particles according to an embodiment of the invention, a binding material provided as needed, and an organic solvent, supplying the obtained mixture in a mold, and press-molding the mixture.

Examples of a constituent material of the binding material to be used for producing the powder core 11 include the above-described organic binders and inorganic binders, however, preferably, an organic binder is used, and more preferably, a thermosetting polyimide or epoxy resin is used. Such a resin material is easily cured by heating, and also has excellent heat resistance. Accordingly, such a material can facilitate the production of the powder core 11, and also can enhance the heat resistance thereof.

The ratio of the amount of the binding material to the amount of the composite particles 5 varies slightly depending on the intended magnetic flux density of the powder core 11 to be produced, an acceptable level of eddy current loss, and the like, but is preferably about 0.5% by mass or more and 5% by mass or less, more preferably about 1% by mass or more and 3% by mass or less. According to this, the density of the powder core 11 is ensured to some extent while reliably insulating the composite particles 5 from one another, whereby a significant decrease in the magnetic permeability of the powder core 11 can be prevented. As a result, a powder core 11 having a higher magnetic permeability and a lower loss is obtained.

The organic solvent is not particularly limited as long as it can dissolve the binding material, but examples thereof include various solvents such as toluene, isopropyl alcohol, acetone, methyl ethyl ketone, chloroform, and ethyl acetate.

To the above-described mixture, any of a variety of additives may be added for an arbitrary purpose as needed.

Such a binding material ensures the shape retention of the powder core 11 and also ensures the insulation between the composite particles 5. Accordingly, even if the insulating layers 31 and 41 are omitted, a powder core whose iron loss has been decreased to a low level is obtained.

Examples of a constituent material of the conductive wire 12 include highly conductive materials such as metallic materials (such as Cu, Al, Ag, Au, and Ni) and alloys containing such a metallic material.

It is preferred that on the surface of the conductive wire 12, an insulating surface layer is provided. According to this, a short circuit between the powder core 11 and the conductive wire 12 can be reliably prevented.

Examples of a constituent material of such a surface layer include various resin materials.

Next, a method for producing the choke coil 10 will be described.

First, the composite particles 5 (the composite particles according to an embodiment of the invention), a binding material, all sorts of necessary additives, and an organic solvent are mixed, whereby a mixture is obtained.

Subsequently, the mixture is dried to obtain a block-shaped dry material. Then, the thus obtained dry material is pulverized, whereby a granular powder is formed.

Subsequently, this mixture or the granular powder is molded into a shape of a powder core to be produced, whereby a molded body is obtained.

A molding method in this case is not particularly limited, however, the examples thereof include press-molding, extrusion-molding, and injection-molding. The shape and size of this molded body are determined in anticipation of shrinkage when heating the molded body in the subsequent step.

Subsequently, by heating the obtained molded body, the binding material is cured, whereby the powder core 11 is obtained. The heating temperature at this time varies slightly depending on the composition of the binding material and the like, however, in the case where the binding material is composed of an organic binder, it is set to preferably about 100° C. or higher and 500° C. or lower, more preferably about 120° C. or higher and 250° C. or lower. The heating time varies depending on the heating temperature, but is set to about 0.5 hours or more and 5 hours or less.

According to the above-described method, the choke coil (the magnetic element according to an embodiment of the invention) 10 including the powder core (the powder core according to an embodiment of the invention) 11 obtained by press-molding the composite particles according to an embodiment of the invention and the conductive wire 12 wound around the powder core 11 along the outer peripheral surface thereof is obtained. By using the composite particles 5 in the production of such a powder core 11, the core particles 3 and the coating particles 40 are uniformly distributed in the powder core 11, and also the coating particles 40 penetrate into a gap between the core particles 3. As a result, a powder core 11 having a high packing ratio and therefore having a high magnetic permeability and a high saturation magnetic flux density is obtained. Accordingly, the choke coil 10 including the powder core 11 has excellent magnetic responsivity and a low loss such that the loss (iron loss) in a high-frequency range is low. Moreover, a decrease in the size of the choke coil 10, an increase in rated current, and a decrease in the amount of heat generation can be easily realized. That is, a high-performance choke coil 10 is obtained.

Second Embodiment

Next, a choke coil to which a magnetic element according to a second embodiment of the invention is applied will be described.

Figure 4:
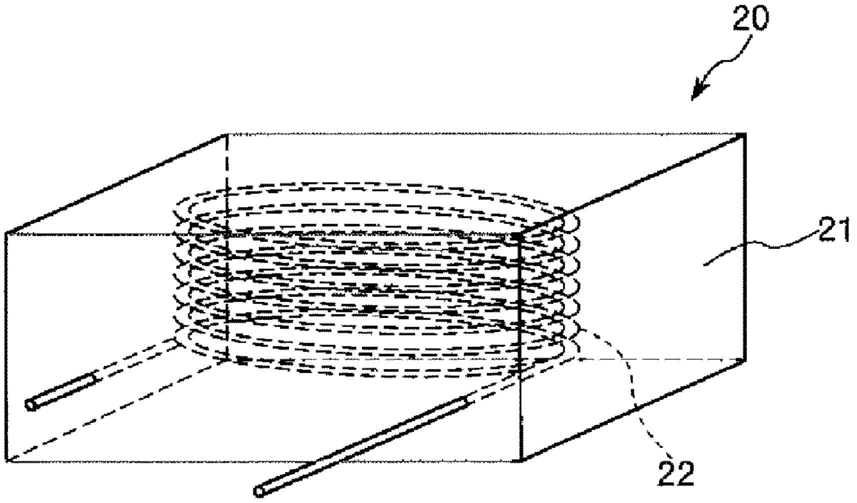
FIG. 4 is a schematic view (a transparent perspective view) showing a choke coil, to which a magnetic element according to a second embodiment of the invention is applied.

FIG. 4 is a schematic view (a transparent perspective view) showing a choke coil to which a magnetic element according to a second embodiment of the invention is applied.

Hereinafter, the choke coil according to the second embodiment will be described, however, different points from the choke coil according to the first embodiment described above will be mainly described and the description of the same matter will be omitted.

As shown in FIG. 4, a choke coil 20 according to this embodiment includes a conductive wire 22 formed into a coil and embedded inside a powder core 21. That is, the choke coil 20 is obtained by molding the conductive wire 22 with the powder core 21.

As the choke coil 20 having such a configuration, a relatively small choke coil is easily obtained. In the case where such a small choke coil 20 is produced, the powder core 21 having a high magnetic permeability, a high magnetic flux density, and a low loss exhibits its action and advantage more effectively. That is, the choke coil 20 which has a low loss and generates low heat so as to be able to cope with a high current although it has a smaller size is obtained.

Further, since the conductive wire 22 is embedded inside the powder core 21, a void is hardly generated between the conductive wire 22 and the powder core 21. According to this, vibration of the powder core 21 due to magnetostriction is prevented, and thus, it is also possible to prevent the generation of noise accompanying this vibration.

In the case where the choke coil 20 according to this embodiment as described above is produced, first, the conductive wire 22 is disposed in a cavity of a mold, and also the composite particles according to an embodiment of the invention are packed in the cavity. In other words, the composite particles are packed therein so that the conductive wire 22 is embedded therein.

Subsequently, the composite particles are compressed together with the conductive wire 22, whereby a molded body is obtained.

Subsequently, in the same manner as the above-described first embodiment, the obtained molded body is subjected to a heat treatment. By doing this, the choke coil 20 is obtained.

Portable Electronic Device

Next, a portable electronic device (the portable electronic device according to an embodiment of the invention) including the magnetic element according to an embodiment of the invention will be described with reference to FIGS. 5 to 7.

Figure 5:
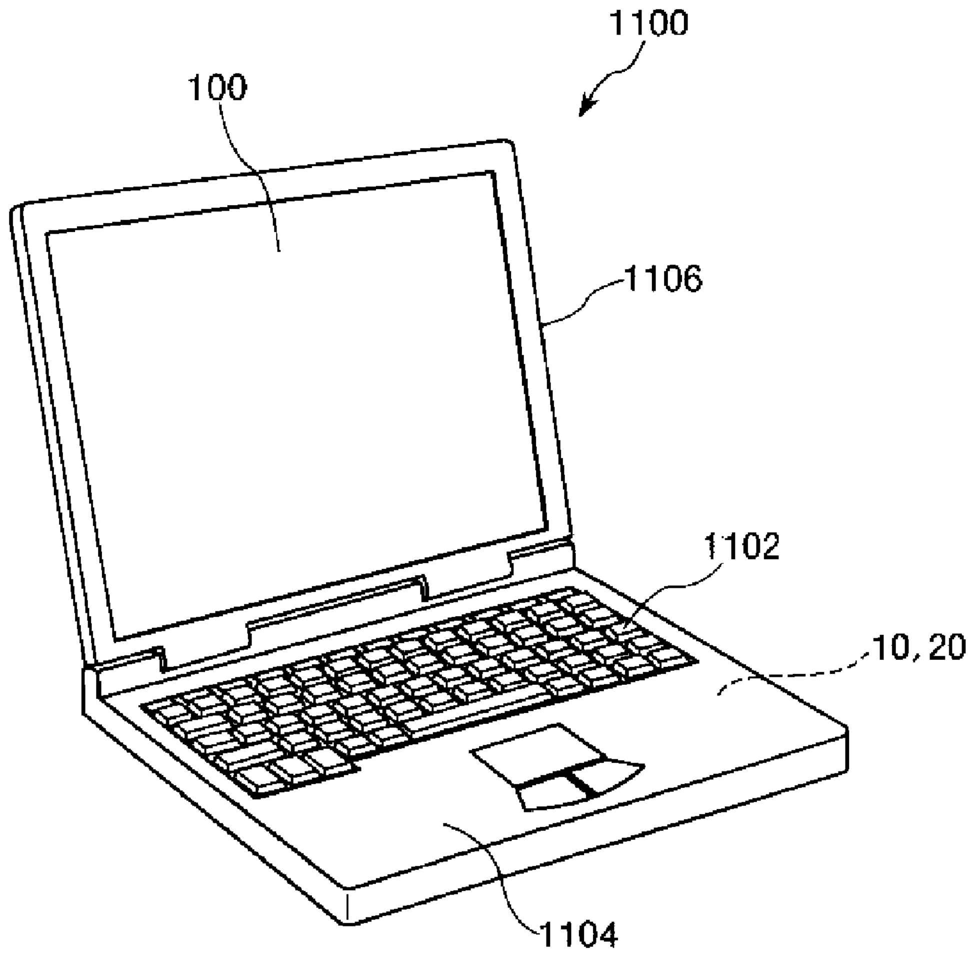
FIG. 5 is a perspective view showing a structure of a personal computer of a mobile type (or a notebook type), to which a portable electronic device including a magnetic element according to an embodiment of the invention is applied.

FIG. 5 is a perspective view showing a structure of a personal computer of a mobile type (or a notebook type), to which a portable electronic device including the magnetic element according to an embodiment of the invention is applied. In this drawing, a personal computer 1100 includes a main body 1104 provided with a key board 1102, and a display unit 1106 provided with a display section 100. The display unit 1106 is supported rotatably with respect to the main body 1104 via a hinge structure. Such a personal computer 1100 has built-in choke coils 10 and 20.

Figure 6:
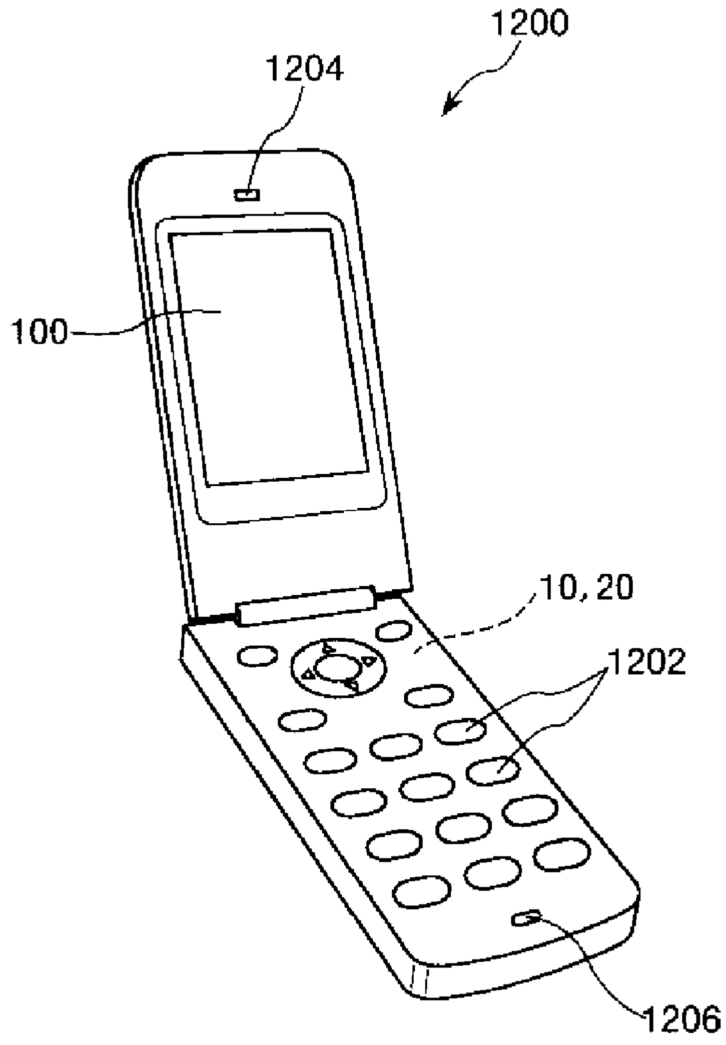
FIG. 6 is a perspective view showing a structure of a cellular phone (also including a PHS), to which a portable electronic device including a magnetic element according to an embodiment of the invention is applied.

FIG. 6 is a perspective view showing a structure of a cellular phone (also including a PHS), to which a portable electronic device including the magnetic element according to an embodiment of the invention is applied. In this drawing, a cellular phone 1200 includes a plurality of operation buttons 1202, an earpiece 1204, and a mouthpiece 1206, and between the operation buttons 1202 and the earpiece 1204, a display section 100 is placed. Such a cellular phone 1200 has built-in choke coils 10 and 20, each of which functions as a filter, an oscillator, or the like.

Figure 7:
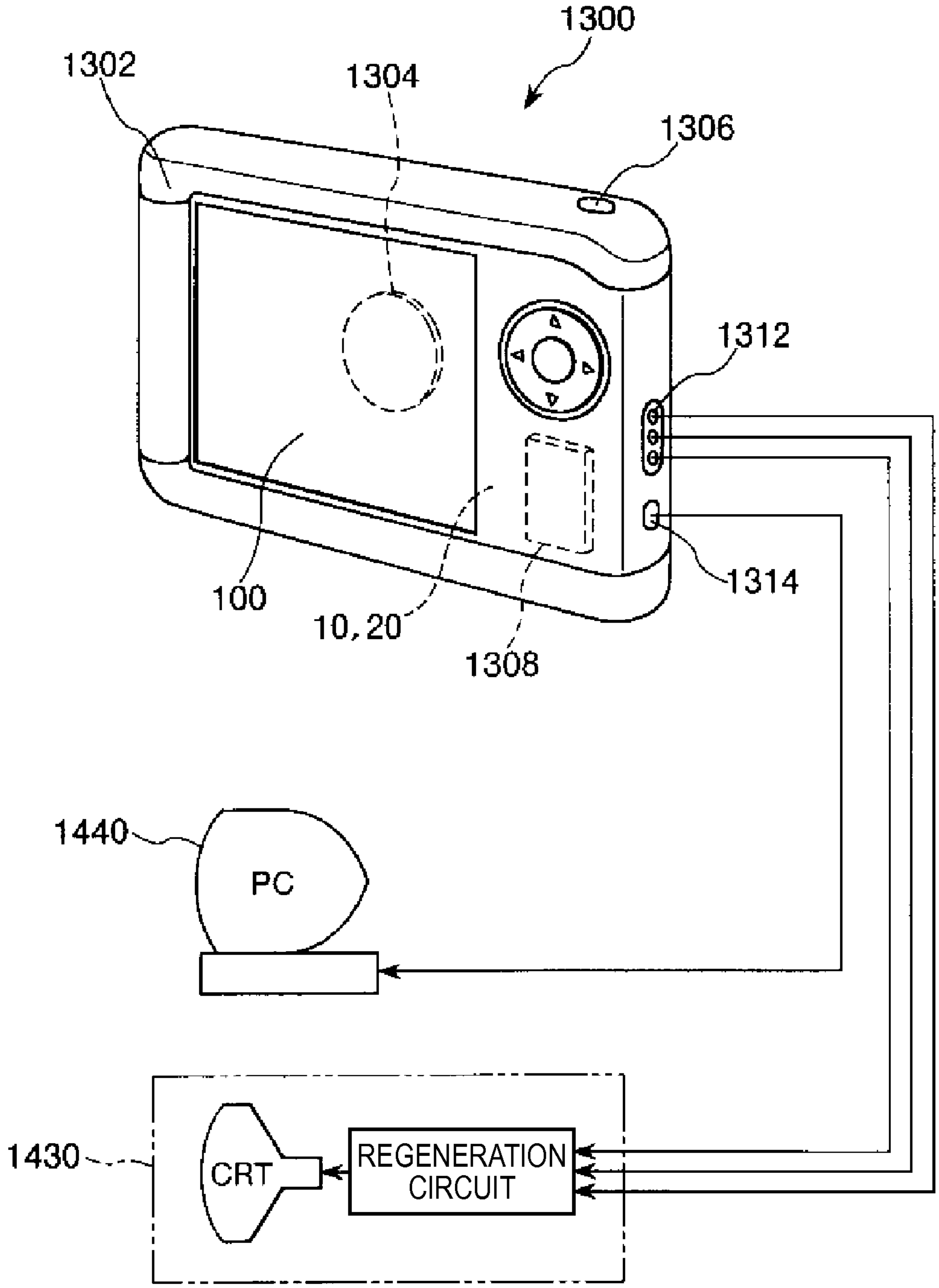
FIG. 7 is a perspective view showing a structure of a digital still camera, to which a portable electronic device including a magnetic element according to an embodiment of the invention is applied.

FIG. 7 is a perspective view showing a structure of a digital still camera, to which a portable electronic device including the magnetic element according to the invention is applied. In this drawing, connection to external apparatuses is also briefly shown. A usual camera exposes a silver salt photographic film to light on the basis of an optical image of a subject. On the other hand, a digital still camera 1300 generates an imaging signal (an image signal) by photoelectrically converting an optical image of a subject into the imaging signal with an imaging device such as a CCD (Charge Coupled Device).

On a back surface of a case (body) 1302 in the digital still camera 1300, a display section is provided, and the display section is configured to perform display on the basis of the imaging signal of the CCD. The display section functions as a finder which displays a subject as an electronic image. Further, on a front surface side (on a back surface side in the drawing) of the case 1302, a light receiving unit 1304 including an optical lens (an imaging optical system), a CCD, and the like is provided.

When a person who takes a picture confirms an image of a subject displayed on the display section and pushes a shutter button 1306, an imaging signal of the CCD at that time is transferred to a memory 1308 and stored there. Further, a video signal output terminal 1312 and an input/output terminal 1314 for data communication are provided on a side surface of the case 1302 in the digital still camera 1300. As shown in the drawing, a television monitor 1430 and a personal computer 1440 are connected to the video signal output terminal 1312 and the input/output terminal 1314 for data communication, respectively, as needed. Moreover, the digital still camera 1300 is configured such that the imaging signal stored in the memory 1308 is output to the television monitor 1430 or the personal computer 1440 by a predetermined operation. Such a digital still camera 1300 has built-in choke coils 10 and 20.

Incidentally, the portable electronic device including the magnetic element according to an embodiment of the invention can be applied to, other than the personal computer (mobile personal computer) shown in FIG. 5, the cellular phone shown in FIG. 6, and the digital still camera shown in FIG. 7, for example, inkjet type ejection apparatuses (e.g., inkjet printers), laptop personal computers, televisions, video cameras, videotape recorders, car navigation devices, pagers, electronic notebooks (including those having a communication function), electronic dictionaries, pocket calculators, electronic game devices, word processors, work stations, television telephones, television monitors for crime prevention, electronic binoculars, POS terminals, medical devices (e.g., electronic thermometers, blood pressure meters, blood sugar meters, electrocardiogram monitoring devices, ultrasound diagnostic devices, and electronic endoscopes), fish finders, various measurement devices, gauges (e.g., gauges for vehicles, airplanes, and ships), flight simulators, and the like.

Hereinabove, the composite particle, the method for producing a composite particle, the powder core, the magnetic element, and the portable electronic device according to the invention have been described based on the preferred embodiments, but the invention is not limited thereto.

For example, in the above-described embodiments, as the application example of the composite particle of the invention, the powder core is described, however, the application example is not limited thereto, and for example, the application example may be a compressed powder body such as a magnetic screening sheet or a magnetic head.

EXAMPLES

Hereinafter, specific examples of embodiments of the invention will be described.

1. Production of Powder Core and Choke Coil

Sample No. 1

<1> First, core particles composed of an Fe-6.5 mass % Si alloy and coating particles composed of an Fe-50 mass % Ni alloy were prepared. These core particles and coating particles were obtained by melting the respective starting materials in a high-frequency induction furnace and powdering the melted materials by a water atomization process.

<2> Subsequently, the core particles and a phosphate glass were fed to a mechanical particle compounding device, whereby the phosphate glass was adhered to the surfaces of the core particles. By doing this, core particles with an insulating layer were obtained. In the same manner as described above, the coating particles and a phosphate glass were fed to a mechanical particle compounding device, whereby the phosphate glass was adhered to the surfaces of the coating particles. By doing this, coating particles with an insulating layer were obtained. The phosphate glass was a $SnO—P_2O_5—MgO$ glass (SnO: 62 mol %, $P_2O_5$: 33 mol %, and MgO: 5 mol %) having a softening point of 404° C.

<3> Subsequently, the core particles with the insulating layer and the coating particles with the insulating layer were fed to a mechanical particle compounding device, and fusion-bonded to each other. By doing this, composite particles each including the core particle and the coating layer covering the core particle were obtained. To the mechanical particle compounding device, the core particles with the insulating layer and the coating particles with the insulating layer were fed such that the mass ratio of the core particles to the coating particles was 10:90.

The obtained composite particle was cut, and for the cross section of the cut particle, the hardness was measured using a micro-Vickers hardness tester. The measured Vickers hardnesses HV1 and HV2 of the cross sections of the core particle and the coating layer are shown in Table 1.

Further, the obtained composite particles were observed by a scanning electron microscope, and observed images of the core particle and the coating layer were obtained. Then, the equivalent circle diameter was measured from the observed image of the core particle, and the half r of the measured equivalent circle diameter of the core particle is shown in Table 1. Further, the average thickness was measured from the observed image of the coating layer, and the measured average thickness t of the coating layer is shown in Table 1. Incidentally, the coating layer was distributed so as to cover at least 70% of the surface of the core particle (coverage: 70%).

<4> Subsequently, the obtained composite particles, an epoxy resin (a binding material), and toluene (an organic solvent) were mixed, whereby a mixture was obtained. The addition amount of the epoxy resin was set to 2 parts by mass with respect to 100 parts by mass of the composite particles.

<5> Subsequently, the obtained mixture was stirred, and then, dried by heating at 60° C. for 1 hour, whereby a block-shaped dry material was obtained. Then, this dry material was sieved through a sieve with a mesh size of 500 μm to pulverize the dry material, whereby a granular powder was obtained.

<6> Subsequently, the obtained granular powder was packed in a mold, and a molded body was obtained according to the following molding condition.

Molding Condition

Molding process: press-molding

Shape of molded body: ring

Size of molded body: outer diameter: 28 mm, inner diameter: 14 mm, thickness: 10.5 mm Molding pressure: 20 $t/cm^2$ (1.96 GPa)

<7> Subsequently, the molded body was heated in an air atmosphere at 450° C. for 0.5 hours to cure the binding material. By doing this, a powder core was obtained.

<8> Subsequently, by using the obtained powder core, a choke coil (a magnetic element) shown in FIG. 3 was produced according to the following production condition.

Coil Production Condition

Constituent material of conductive wire: Cu

Conductive wire diameter: 0.5 mm

Winding number (when measuring magnetic permeability): 7 turns

Winding number (when measuring iron loss): 30 turns (primary side), 30 turns (secondary side)

Sample Nos. 2 to 23

Powder cores were obtained in the same manner as in the case of Sample No. 1 except that as the composite particles, those shown in Tables 1 and 2 were used, and by using the obtained powder cores, choke coils were obtained. The coverage of the surface of each core particle with the coating layer was from 70 to 85%.

Sample No. 24

After the core particles and the coating particles were stirred and mixed by a stirring mixer which performs only stirring, the obtained mixed powder, an epoxy resin (a binding material), and toluene (an organic solvent) were mixed, whereby a mixture was obtained. Thereafter, a process was performed in the same manner as in the case of Sample No. 1, whereby a powder core was obtained, and by using the obtained powder core, a choke coil was obtained.

In Tables 1 and 2, among the soft magnetic powders of the respective sample numbers, those corresponding to embodiments of the invention are represented by "Example", and those not corresponding to embodiments of the invention are represented by "Comparative Example". In Tables 1 and 2, (c) indicates that the constituent material of each particle is a crystalline soft magnetic metallic material, and (a) indicates that the constituent material of each particle is an amorphous soft magnetic metallic material.

Sample No. 25

A powder core was obtained in the same manner as in the case of Sample No. 5, except that the coverage of the surface of each core particle with the coating particles was decreased to 55% in the composite particles by decreasing the addition amount of the coating particles, and by using the obtained powder core, a choke coil was obtained.

Sample No. 26

A powder core was obtained in the same manner as in the case of Sample No. 5, except that the coverage of the surface of each core particle with the coating particles was decreased to 40% in the composite particles by decreasing the addition amount of the coating particles, and by using the obtained powder core, a choke coil was obtained.

2. Evaluation of Composite Particle, Powder Core, and Choke Coil 2.1 Measurement of Average Crystal Grain Size by X-Ray Diffractometry The X-ray diffraction spectrum of the composite particle of each sample number was obtained by X-ray diffractometry. For example, in the X-ray diffraction spectrum of the composite particle of Sample No. 1, a diffraction peak derived from an Fe—Si-based alloy and a diffraction peak derived from an Fe—Ni-based alloy were contained.

Therefore, based on the shape (half width) of each diffraction peak, the average crystal grain size of the crystalline structure contained in the core particle and the average crystal grain size of the crystalline structure contained in the coating layer were calculated. The calculation results are shown in Tables 1 and 2.

2.2 Measurement of Density of Powder Core

The density of the powder core of each sample number was measured. Then, based on a true specific gravity calculated from the composition of the composite particle of each sample number, the relative density of each powder core was calculated. The calculation results are shown in Tables 1 and 2.

2.3 Measurement of Magnetic Permeability of Choke Coil

The magnetic permeability μ' and the iron loss (core loss Pcv) of the choke coil of each sample number were measured according to the following measurement condition. The measurement results are shown in Tables 1 and 2.

Measurement Condition

Measurement frequency (magnetic permeability): 10 kHz, 100 kHz, 1000 kHz

Measurement frequency (iron loss): 50 kHz, 100 kHz

Maximum magnetic flux density: 50 mT, 100 mT

Measurement device: AC Magnetic Property Measurement System (B-H analyzer SY8258, manufactured by Iwatsu Test Instruments Corporation)

TABLE 1

| | | | No. 1 Example | No. 2 Example | No. 3 Example | No. 4 Example | No. 5 Example | No. 6 Example |
|---|---|---|---|---|---|---|---|---|
| Core particle | Fe—6.5Si (c) | Parts by mass | 10 | 20 | 30 | 40 | 50 | 60 |
| | Fe—Si—B (a) | Parts by mass | | | | | | |
| | Fe—Si—Al (c) | Parts by mass | | | | | | |
| | Fe—Si—B—C (a) | Parts by mass | | | | | | |
| | Vickers hardness HV1 | — | 376 | 381 | 362 | 411 | 378 | 425 |
| | Half of equivalent circle diameter r | μm | 17 | 18 | 30 | 16 | 27 | 22 |
| | Average crystal grain size | nm | 57 | 55 | 59 | 49 | 56 | 42 |
| Coating particle | Fe—50Ni (c) | Parts by mass | 90 | 80 | 70 | 60 | 50 | 40 |
| | Fe—0.5B (c) | Parts by mass | | | | | | |
| | Fe—1Cr (c) | Parts by mass | | | | | | |
| | Pure Fe (c) | Parts by mass | | | | | | |
| | Vickers hardness HV2 | — | 202 | 213 | 218 | 198 | 221 | 205 |
| | Average thickness t | μm | 10 | 12 | 14 | 10 | 18 | 10 |
| | Average crystal grain size | nm | 90 | 88 | 85 | 95 | 78 | 91 |
| HV1-HV2 | | — | 174 | 168 | 144 | 213 | 157 | 220 |
| t/r | | — | 0.59 | 0.67 | 0.47 | 0.63 | 0.67 | 0.45 |
| Average crystal grain size of core particle/Average crystal grain size of coating particle | | — | 0.63 | 0.63 | 0.69 | 0.52 | 0.72 | 0.46 |
| Evaluation results | Relative density | % | 89.7 | 89.1 | 88.5 | 87.9 | 87.2 | 86.6 |
| | Magnetic permeability μ' 10 kHz | — | 64.3 | 63.8 | 63.3 | 62.7 | 62.2 | 61.2 |
| | Magnetic permeability μ' 100 kHz | — | — | — | — | 62.7 | 62.4 | 61.1 |
| | Magnetic permeability μ' 1000 kHz | — | — | — | — | 62.3 | 61.8 | 60.6 |
| | Iron loss Bm = 50 mT 50 kHz | kW/m$^3$ | 244 | 248 | 250 | 256 | 255 | 270 |
| | Iron loss Bm = 50 mT 100 kHz | kW/m$^3$ | — | — | — | 535 | 532 | 555 |
| | Iron loss Bm = 100 mT 50 kHz | kW/m$^3$ | 1487 | 1497 | 1506 | 1516 | 1519 | 1551 |
| | Iron loss Bm = 100 mT 100 kHz | kW/m$^3$ | — | — | — | 3162 | 3176 | 3257 |

TABLE 1-continued

| | | | | No. 7 Example | No. 8 Example | No. 9 Example | No. 10 Example | No. 11 Comparative Example | No. 12 Comparative Example |
|---|---|---|---|---|---|---|---|---|---|
| Core particle | Fe—6.5Si (c) | | Parts by mass | 70 | 80 | 90 | 95 | 0 | 100 |
| | Fe—Si—B (a) | | Parts by mass | | | | | | |
| | Fe—Si—Al (c) | | Parts by mass | | | | | | |
| | Fe—Si—B—C (a) | | Parts by mass | | | | | | |
| | Vickers hardness HV1 | | — | 358 | 349 | 371 | 450 | — | 384 |
| | Half of equivalent circle diameter r | | μm | 23 | 18 | 16 | 15 | — | 16 |
| | Average crystal grain size | | nm | 60 | 62 | 57 | 37 | — | 56 |
| Coating particle | Fe—50Ni (c) | | Parts by mass | 30 | 20 | 10 | 5 | 100 | 0 |
| | Fe—0.5B (c) | | Parts by mass | | | | | | |
| | Fe—1Cr (c) | | Parts by mass | | | | | | |
| | Pure Fe (c) | | Parts by mass | | | | | | |
| | Vickers hardness HV2 | | — | 178 | 184 | 230 | 246 | 210 | — |
| | Average thickness t | | μm | 8 | 4 | 10 | 3 | 11 | — |
| | Average crystal grain size | | nm | 112 | 106 | 63 | 71 | 87 | — |
| HV1-HV2 | | | — | 180 | 165 | 141 | 204 | — | — |
| t/r | | | — | 0.35 | 0.22 | 0.63 | 0.20 | — | — |
| Average crystal grain size of core particle/Average crystal grain size of coating particle | | | — | 0.54 | 0.58 | 0.90 | 0.52 | — | — |
| Evaluation results | Relative density | | % | 85.9 | 84.8 | 83.1 | 82.6 | 80.2 | 78.4 |
| | Magnetic | 10 kHz | — | 59.5 | 56.9 | 54.0 | 52.7 | 45.3 | 41.2 |
| | permeability | 100 kHz | — | 59.4 | 56.8 | 54.1 | — | — | — |
| | μ' | 1000 kHz | — | 58.9 | 56.3 | 53.7 | — | — | — |
| | Iron loss | 50 kHz | kW/m$^3$ | 259 | 265 | 272 | 275 | 258 | 425 |
| | Bm = 50 mT | 100 kHz | kW/m$^3$ | 544 | 555 | 578 | — | — | — |
| | Iron loss | 50 kHz | kW/m$^3$ | 1598 | 1568 | 1617 | 1629 | 1554 | 2351 |
| | Bm = 100 mT | 100 kHz | kW/m$^3$ | 3369 | 3325 | 3448 | — | — | — |

TABLE 2

| | | | | No. 13 Example | No. 14 Example | No. 15 Example | No. 16 Example | No. 17 Example | No. 18 Example |
|---|---|---|---|---|---|---|---|---|---|
| Core particle | Fe—6.5Si (c) | | Parts by mass | | | | | | |
| | Fe—Si—B (a) | | Parts by mass | 50 | 70 | 0 | 100 | | |
| | Fe-Si-Al (c) | | Parts by mass | | | | | 30 | 60 |
| | Fe—Si—B—C (a) | | Parts by mass | | | | | | |
| | Vickers hardness HV1 | | — | 805 | 812 | — | 708 | 480 | 425 |
| | Half of equivalent circle diameter r | | μm | 20 | 42 | — | 41 | 27 | 22 |
| | Average crystal grain size | | nm | 0 | 0 | — | 0 | 56 | 42 |
| Coating particle | Fe—50Ni (c) | | Parts by mass | | | | | | |
| | Fe—0.5B (c) | | Parts by mass | 50 | 30 | 100 | 0 | | |
| | Fe—1Cr (c) | | Parts by mass | | | | | 70 | 40 |
| | Pure Fe (c) | | Parts by mass | | | | | | |
| | Vickers hardness HV2 | | — | 246 | 241 | 278 | — | 193 | 205 |
| | Average thickness t | | μm | 10 | 15 | 15 | — | 5 | 10 |
| | Average crystal grain size | | nm | 90 | 74 | 85 | — | 78 | 72 |
| HV1-HV2 | | | — | 559 | 571 | — | — | 287 | 220 |
| t/r | | | — | 0.50 | 0.36 | — | — | 0.19 | 0.45 |
| Average crystal grain size of core particle/Average crystal grain size of coating particle | | | — | 0.00 | 0.00 | — | — | 0.72 | 0.58 |
| Evaluation results | Relative density | | % | 89.5 | 88.5 | 80.5 | 79.2 | 89.1 | 88.5 |
| | Magnetic | 10 kHz | — | 70.9 | 71.6 | 54.2 | 58.2 | 62.2 | 61.2 |
| | permeability | 100 kHz | — | — | — | — | — | — | — |
| | μ' | 1000 kHz | — | — | — | — | — | — | — |
| | Iron loss | 50 kHz | kW/m$^3$ | 63 | 64 | 70 | 75 | 255 | 270 |
| | Bm = 50 mT | 100 kHz | kW/m$^3$ | — | — | — | — | — | — |
| | Iron loss | 50 kHz | kW/m$^3$ | 376 | 378 | 402 | 423 | 1519 | 1551 |
| | Bm = 100 mT | 100 kHz | kW/m$^3$ | — | — | — | — | — | — |

TABLE 2-continued

| | | | | No. 19 Comparative Example | No. 20 Comparative Example | No. 21 Comparative Example | No. 22 Comparative Example | No. 23 Comparative Example | No. 24 Comparative Example |
|---|---|---|---|---|---|---|---|---|---|
| Core particle | Fe—6.5Si (c) | | Parts by mass | | | | F—50Ni (c) | 50 | 50 |
| | Fe—Si—B (a) | | Parts by mass | | | | | | |
| | Fe—Si—Al (c) | | Parts by mass | 0 | 100 | | | | |
| | Fe—Si—B—C (a) | | Parts by mass | | | 50 | | | |
| | Vickers hardness HV1 | | — | — | 449 | 1321 | 210 | 348 | 370 |
| | Half of equivalent circle diameter r | | µm | — | 18 | 14 | 12 | 52 | 25 |
| | Average crystal grain size | | nm | — | 60 | — | — | — | 55 |
| Coating particle | Fe—50Ni (c) | | Parts by mass | | | | | | 50 |
| | Fe—0.5B (c) | | Parts by mass | | | | | 50 | |
| | Fe—1Cr (c) | | Parts by mass | 100 | 0 | | | | |
| | Pure Fe (c) | | Parts by mass | | | 50 | 50 | | |
| | Vickers hardness HV2 | | — | 178 | — | 95 | 94 | 245 | 275 |
| | Average thickness t | | µm | 12 | — | 15 | 21 | 1.5 | 16 |
| | Average crystal grain size | | nm | 81 | — | 185 | 203 | 36 | 42 |
| HV1-HV2 | | | — | — | — | 1226 | 116 | 103 | 95 |
| t/r | | | — | — | — | 1.07 | 1.75 | 0.03 | 0.64 |
| Average crystal grain size of core particle/Average crystal grain size of coating particle | | | — | — | — | — | — | — | 1.31 |
| Evaluation results | Relative density | | % | 81.2 | 80.4 | 70.1 | 85.4 | 75.7 | 64.5 |
| | Magnetic permeability µ' | 10 kHz | — | 56.7 | 54.2 | 33.0 | 50.6 | 37.6 | 29.7 |
| | | 100 kHz | — | — | — | — | — | — | — |
| | | 1000 kHz | — | — | — | — | — | — | — |
| | Iron loss Bm = 50 mT | 50 kHz | kW/m$^3$ | 298 | 301 | — | — | — | — |
| | | 100 kHz | kW/m$^3$ | — | — | — | — | — | — |
| | Iron loss Bm = 100 mT | 50 kHz | kW/m$^3$ | 1646 | 1615 | — | — | — | — |
| | | 100 kHz | kW/m$^3$ | — | — | — | — | — | — |

As apparent from Tables 1 and 2, the powder cores corresponding to Examples had a high relative density. Further, the magnetic permeability µ' was in a positive correlation with the relative density, and the powder cores corresponding to Examples showed a relatively high magnetic permeability value. On the other hand, with respect to the iron loss of the choke coil, it was confirmed that the iron loss was low in a wide frequency range in a high frequency band.

Incidentally, the distribution state of the core particles and the coating particles inside the powder core of Sample No. 24 was observed, and it was confirmed that there were regions where only the core particles aggregated locally or only the coating particles aggregated locally.

The above-described composite particles of the respective sample numbers all had the configuration shown in FIG. 1, and therefore, similar samples having the configuration shown in FIG. 2 were also produced and the respective evaluations were performed. As a result, the evaluation results of the samples having the configuration shown in FIG. 2 showed the same tendency as that of the evaluation results of the above-described composite particles of the respective sample numbers.

Although not shown in the respective tables, the powder cores of Sample Nos. 25 and 26 had a lower relative density as compared with the powder cores corresponding to the respective Examples shown in Tables 1 and 2. It is considered that this is due to the effect of low coverage.

The entire disclosure of Japanese Patent Application No. 2012-254453 filed Nov. 20, 2012 is incorporated by reference herein.

What is claimed is:

1. A composite particle, comprising:

a particle composed of a soft magnetic metallic material;

a coating layer composed of a plurality of coating particles that are each formed of a soft magnetic metallic material having a different composition from that of the particle and fusion-bonded to the particle; and an insulating layer between the particle and the coating layer, wherein when a Vickers hardness of the particle is represented by HV1 and a Vickers hardness of the coating layer is represented by HV2, HV1 and HV2 satisfy: $100 \leq HV1 - HV2$, and when half of a projected area circle equivalent diameter of the particle is represented by r and an average thickness of the coating layer is represented by t, r and t satisfy: $0.05 \leq t/r \leq 1$.

2. The composite particle according to claim 1, wherein HV1 and HV2 satisfy: $250 \leq HV1 \leq 1200$ and $100 \leq HV2 \leq 250$, respectively.

3. The composite particle according to claim 1, wherein the soft magnetic metallic material constituting the particle and the soft magnetic metallic material constituting the coating layer are each a crystalline metallic material, and an average crystal grain size in the particle as measured by X-ray diffractometry is 0.2 times or more and 0.95 times or less than an average crystal grain size in the coating layer as measured by X-ray diffractometry.

4. The composite particle according to claim 1, wherein the soft magnetic metallic material constituting the particle is an amorphous metallic material or a nanocrystalline metallic material, and the soft magnetic metallic material constituting the coating layer is a crystalline metallic material.

5. The composite particle according to claim 1, wherein the soft magnetic metallic material constituting the particle is an Fe—Si-based material.

6. The composite particle according to claim 5, wherein the soft magnetic metallic material constituting the coating layer is any of pure Fe, an Fe—B-based material, an Fe—Cr-based material, and an Fe—Ni-based material.

7. The composite particle according to claim 1, wherein the coating layer covers an entire surface of the particle.

8. A method for producing a composite particle, comprising:

forming a coating layer by fusion-bonding coating particles to a surface of a particle through mechanical pressure welding, the coating particles having a smaller diameter than the particle, wherein an insulating layer is located between the particle and the coating layer, the particle is composed of a soft magnetic metallic material and the coating layer is composed of a soft magnetic metallic material having a different composition from that of the particle and is fusion-bonded to the particle, when a Vickers hardness of the particle is represented by HV1 and a Vickers hardness of the coating layer is represented by HV2, HV1 and HV2 satisfy: $100 \leq HV1-HV2$, when half of a projected area circle equivalent diameter of the particle is represented by r and an average thickness of the coating layer is represented by t, r and t satisfy: $0.05 \leq t/r \leq 1$.

9. The method for producing a composite particle according to claim 8, wherein the coating particles are fusion-bonded to the particle so as to entirely cover the surface of the particle.

10. A powder core, comprising:

a compressed powder body obtained by compression-molding composite particles each including a particle composed of a soft magnetic metallic material and a coating layer composed of a plurality of coating particles each formed of a soft magnetic metallic material having a different composition from that of the particle and fusion-bonded to the particle so as to cover the particle and a binding material which binds the composite particles, an insulating layer between located between the particle and the coating layer, wherein when a Vickers hardness of the particle is represented by HV1 and a Vickers hardness of the coating layer is represented by HV2, HV1 and HV2 satisfy: $100 \leq HV1-HV2$, and when half of a projected area circle equivalent diameter of the particle is represented by r and an average thickness of the coating layer is represented by t, r and t satisfy: $0.05 \leq t/r \leq 1$.

11. A magnetic element, comprising the powder core according to claim 10.

12. A portable electronic device, comprising the magnetic element according to claim 11.

* * * * *